US007460839B2

(12) United States Patent
Leabman

(10) Patent No.: US 7,460,839 B2
(45) Date of Patent: Dec. 2, 2008

(54) NON-SIMULTANEOUS FREQUENCY DIVERSITY IN RADIO COMMUNICATION SYSTEMS

(75) Inventor: Michael Leabman, Sunnyvale, CA (US)

(73) Assignee: PureWave Networks, Inc., Mountain View, CA (US)

( * ) Notice: Subject to any disclaimer, the term of this patent is extended or adjusted under 35 U.S.C. 154(b) by 267 days.

(21) Appl. No.: 10/893,821

(22) Filed: Jul. 19, 2004

(65) Prior Publication Data

US 2006/0030279 A1 Feb. 9, 2006

(51) Int. Cl.
*H04B 1/02* (2006.01)
(52) U.S. Cl. .................. 455/101; 455/91; 455/141; 455/130; 375/267; 375/132
(58) Field of Classification Search .......... 455/101, 455/141, 91, 130; 375/267, 132
See application file for complete search history.

(56) References Cited

U.S. PATENT DOCUMENTS

| | | | |
|---|---|---|---|
| 4,651,155 A | 3/1987 | Baurle et al. | |
| 4,800,390 A | 1/1989 | Searle | |
| 5,515,378 A | 5/1996 | Roy, III et al. | |
| 5,519,735 A | 5/1996 | Rice et al. | |
| 5,546,090 A | 8/1996 | Roy, III et al. | |
| 5,592,490 A | 1/1997 | Barratt et al. | |
| 5,619,503 A | 4/1997 | Dent | |
| 5,625,880 A | 4/1997 | Goldburg et al. | |
| 5,642,353 A | 6/1997 | Roy, III et al. | |
| 5,694,416 A | 12/1997 | Johnson | |
| 5,828,658 A | 10/1998 | Ottersten et al. | |
| 5,886,988 A | 3/1999 | Yun et al. | |
| 5,894,473 A | 4/1999 | Dent | |
| 5,909,470 A | 6/1999 | Barratt et al. | |
| 5,909,471 A | 6/1999 | Yun | |
| 5,930,243 A | 7/1999 | Parish et al. | |
| 5,933,421 A | 8/1999 | Alamouti et al. | |
| 5,955,992 A | 9/1999 | Shattil | |

(Continued)

OTHER PUBLICATIONS

Leabman, Michael A. *Adaptive band-partitioning of interference cancellation in communications systems*. M. Eng. Thesis, MIT EECS, 1997, pp. 1-70.

*Primary Examiner*—Sanh D Phu
(74) *Attorney, Agent, or Firm*—Steptoe & Johnson LLP

(57) ABSTRACT

A radio using non-simultaneous frequency diversity includes: an antenna, a radio frequency module coupled to the antenna such that the radio frequency module is operable to transmit or receive radio frequency signals using the antenna, and a baseband module coupled to the radio frequency module. The baseband module is operable to transmit or receive signals through the radio frequency module, such that signals transmitted or received by the radio employ non-simultaneous frequency diversity. A method for transmitting information using non-simultaneous frequency diversity includes: identifying information to be transmitted, transmitting the identified information on a first channel, and after a predetermined amount of time, transmitting the identified information on a second channel. A method for receiving information transmitted using non-simultaneous frequency diversity includes receiving a first signal transmitted on a first channel; after a predetermined amount of time, receiving a second signal transmitted on a second channel; and identifying transmitted information based on the first signal and the second signal.

31 Claims, 5 Drawing Sheets

Non-Simultaneous Frequency Diversity

U.S. PATENT DOCUMENTS

| Patent No. | | Date | Inventor(s) |
|---|---|---|---|
| 5,966,644 | A * | 10/1999 | Suzuki .................. 455/76 |
| 5,973,642 | A | 10/1999 | Li et al. |
| 5,982,327 | A | 11/1999 | Vook et al. |
| 6,009,124 | A | 12/1999 | Smith et al. |
| 6,009,335 | A | 12/1999 | Murphy |
| 6,023,203 | A | 2/2000 | Parish |
| 6,037,898 | A | 3/2000 | Parish et al. |
| 6,047,189 | A | 4/2000 | Yun et al. |
| 6,122,260 | A | 9/2000 | Liu et al. |
| 6,128,276 | A | 10/2000 | Agee |
| 6,130,859 | A | 10/2000 | Sonnenschein et al. |
| 6,134,261 | A | 10/2000 | Ryan |
| 6,141,393 | A | 10/2000 | Thomas et al. |
| 6,141,542 | A | 10/2000 | Kotzin et al. |
| 6,141,567 | A | 10/2000 | Youssefmir et al. |
| 6,154,661 | A | 11/2000 | Goldburg |
| 6,177,906 | B1 | 1/2001 | Petrus |
| 6,185,440 | B1 | 2/2001 | Barratt et al. |
| 6,240,098 | B1 | 5/2001 | Thibault et al. |
| 6,266,528 | B1 | 7/2001 | Farzaneh |
| 6,275,543 | B1 | 8/2001 | Petrus et al. |
| 6,301,238 | B1 | 10/2001 | Hagerman et al. |
| 6,304,750 | B1 | 10/2001 | Rashid-Farrokhi et al. |
| 6,333,937 | B1 | 12/2001 | Ryan |
| 6,351,499 | B1 | 2/2002 | Paulraj et al. |
| 6,359,923 | B1 | 3/2002 | Agee et al. |
| 6,362,781 | B1 | 3/2002 | Thomas et al. |
| 6,369,758 | B1 | 4/2002 | Zhang |
| 6,370,182 | B2 | 4/2002 | Bierly et al. |
| 6,377,636 | B1 | 4/2002 | Paulraj et al. |
| 6,380,879 | B2 | 4/2002 | Kober et al. |
| 6,441,784 | B1 | 8/2002 | Flore et al. |
| 6,441,786 | B1 | 8/2002 | Jasper et al. |
| 6,445,342 | B1 | 9/2002 | Thomas et al. |
| 6,448,938 | B1 | 9/2002 | Chiang et al. |
| 6,459,171 | B1 | 10/2002 | Leifer |
| 6,463,295 | B1 | 10/2002 | Yun |
| 6,466,565 | B1 | 10/2002 | Wax et al. |
| 6,473,418 | B1 | 10/2002 | Laroia et al. |
| 6,477,161 | B1 | 11/2002 | Hudson et al. |
| 6,477,359 | B2 | 11/2002 | Heppe et al. |
| 6,480,522 | B1 | 11/2002 | Hoole et al. |
| 6,496,140 | B1 | 12/2002 | Alastalo |
| 6,496,535 | B2 | 12/2002 | Xu |
| 6,498,822 | B1 | 12/2002 | Tanaka |
| 6,504,506 | B1 | 1/2003 | Thomas et al. |
| 6,512,737 | B1 | 1/2003 | Agee |
| 6,549,151 | B1 | 4/2003 | Kober et al. |
| 6,553,019 | B1 | 4/2003 | Laroia et al. |
| 6,560,209 | B1 | 5/2003 | Alamouti et al. |
| 6,563,885 | B1 | 5/2003 | Magee et al. |
| 6,564,036 | B1 | 5/2003 | Kasapi |
| 6,570,527 | B1 | 5/2003 | Lindskog et al. |
| 6,584,144 | B2 | 6/2003 | Alamouti et al. |
| 6,587,514 | B1 | 7/2003 | Wright et al. |
| 6,598,014 | B1 | 7/2003 | Rabideau et al. |
| 6,600,776 | B1 | 7/2003 | Alamouti et al. |
| 6,600,914 | B2 | 7/2003 | Uhlik et al. |
| 6,603,806 | B2 | 8/2003 | Martone |
| 6,611,231 | B2 | 8/2003 | Crilly, Jr. et al. |
| 6,615,024 | B1 | 9/2003 | Boros et al. |
| 6,621,851 | B1 | 9/2003 | Agee et al. |
| 6,621,853 | B1 * | 9/2003 | Ku .................. 375/132 |
| 6,628,724 | B2 | 9/2003 | Bannasch et al. |
| 6,633,856 | B2 | 10/2003 | Richardson et al. |
| 6,639,541 | B1 | 10/2003 | Quintana et al. |
| 6,643,281 | B1 | 11/2003 | Ryan |
| 6,643,321 | B1 | 11/2003 | Genossar et al. |
| 6,647,015 | B2 | 11/2003 | Malkemes et al. |
| 6,647,078 | B1 | 11/2003 | Thomas et al. |
| 6,650,714 | B2 | 11/2003 | Dogan et al. |
| 6,650,881 | B1 | 11/2003 | Dogan |
| 6,651,210 | B1 | 11/2003 | Trott et al. |
| 6,654,590 | B2 | 11/2003 | Boros et al. |
| 6,662,024 | B2 | 12/2003 | Walton et al. |
| 6,665,285 | B1 | 12/2003 | Treadaway et al. |
| 6,668,161 | B2 | 12/2003 | Boros et al. |
| 6,680,699 | B2 | 1/2004 | Voyer |
| 6,683,915 | B1 | 1/2004 | Trott et al. |
| 6,684,366 | B1 | 1/2004 | Trott et al. |
| 6,686,879 | B2 | 2/2004 | Shattil |
| 6,687,492 | B1 | 2/2004 | Sugar et al. |
| 6,690,747 | B2 | 2/2004 | Petrus et al. |
| 6,694,147 | B1 | 2/2004 | Viswanath et al. |
| 6,697,436 | B1 | 2/2004 | Wright et al. |
| 6,711,120 | B1 | 3/2004 | Laroia et al. |
| 6,714,551 | B1 | 3/2004 | Le-Ngoc |
| 6,718,184 | B1 | 4/2004 | Aiken et al. |
| 6,728,554 | B1 | 4/2004 | Wegner |
| 6,731,689 | B2 | 5/2004 | Dogan |
| 6,731,705 | B2 | 5/2004 | Kasapi et al. |
| 6,731,710 | B1 | 5/2004 | Genossar et al. |
| 6,731,955 | B2 | 5/2004 | Hirano et al. |
| 6,735,258 | B1 | 5/2004 | Trott et al. |
| 6,735,427 | B2 | 5/2004 | Higbie |
| 6,738,020 | B1 | 5/2004 | Lindskog et al. |
| 6,747,594 | B2 | 6/2004 | Lindskog et al. |
| 6,751,444 | B1 | 6/2004 | Meiyappan |
| 6,757,546 | B1 | 6/2004 | Hagen et al. |
| 6,760,599 | B1 | 7/2004 | Uhlik |
| 6,765,969 | B1 | 7/2004 | Gray et al. |
| 6,768,747 | B1 | 7/2004 | Dogan |
| 6,771,986 | B1 | 8/2004 | Oh |
| 6,772,181 | B1 | 8/2004 | Fu et al. |
| 6,778,513 | B2 | 8/2004 | Kasapi et al. |
| 6,782,039 | B2 | 8/2004 | Alamouti et al. |
| 6,785,256 | B2 | 8/2004 | O'Neill |
| 6,785,300 | B2 | 8/2004 | Hoole |
| 6,785,513 | B1 | 8/2004 | Sivaprakasam |
| 6,785,520 | B2 | 8/2004 | Sugar et al. |
| 6,788,268 | B2 | 9/2004 | Chiang et al. |
| 6,788,270 | B2 | 9/2004 | Suprunov et al. |
| 6,788,948 | B2 | 9/2004 | Lindskog et al. |
| 6,788,963 | B2 | 9/2004 | Laroia et al. |
| 6,795,409 | B1 | 9/2004 | Youssefmir et al. |
| 6,795,413 | B1 | 9/2004 | Uhlik |
| 6,795,424 | B1 | 9/2004 | Kapoor et al. |
| 6,798,843 | B1 | 9/2004 | Wright et al. |
| 6,799,025 | B1 | 9/2004 | Hoshino |
| 6,801,589 | B1 | 10/2004 | Dogan |
| 6,802,038 | B1 | 10/2004 | Yu |
| 6,804,191 | B2 | 10/2004 | Richardson |
| 6,813,263 | B1 | 11/2004 | Margherita |
| 6,822,607 | B2 | 11/2004 | Tanaka et al. |
| 6,823,174 | B1 | 11/2004 | Masenten et al. |
| 6,823,180 | B2 | 11/2004 | Reed et al. |
| 6,826,240 | B1 | 11/2004 | Thomas et al. |
| 6,834,043 | B1 | 12/2004 | Vook et al. |
| 6,834,076 | B2 | 12/2004 | Xu |
| 6,834,249 | B2 | 12/2004 | Orchard |
| 6,836,673 | B1 | 12/2004 | Trott |
| 6,839,573 | B1 | 1/2005 | Youssefmir et al. |
| 6,839,574 | B2 | 1/2005 | Petrus et al. |
| 6,847,678 | B2 | 1/2005 | Berezdivin et al. |
| 6,847,809 | B1 | 1/2005 | Gurelli et al. |
| 6,850,740 | B1 * | 2/2005 | Haartsen .................. 455/101 |
| 6,850,741 | B2 | 2/2005 | Lei et al. |
| 6,853,629 | B2 | 2/2005 | Alamouti et al. |
| 6,853,839 | B2 | 2/2005 | Usuda et al. |
| 6,862,271 | B2 | 3/2005 | Medvedev et al. |
| 6,862,446 | B2 | 3/2005 | O'Neill et al. |
| 6,865,377 | B1 | 3/2005 | Lindskog et al. |
| 6,870,808 | B1 | 3/2005 | Liu et al. |
| 6,873,293 | B2 | 3/2005 | Proctor, Jr. et al. |

| | | | | | |
|---|---|---|---|---|---|
| 6,873,651 B2 | 3/2005 | Tesfai et al. | 6,876,623 B1 | 4/2005 | Lou et al. |
| 6,873,831 B2 | 3/2005 | Attar et al. | | | |
| 6,874,006 B1 | 3/2005 | Fu et al. | * cited by examiner | | |

Simultaneous Frequency Diversity

Non-Simultaneous Frequency Diversity

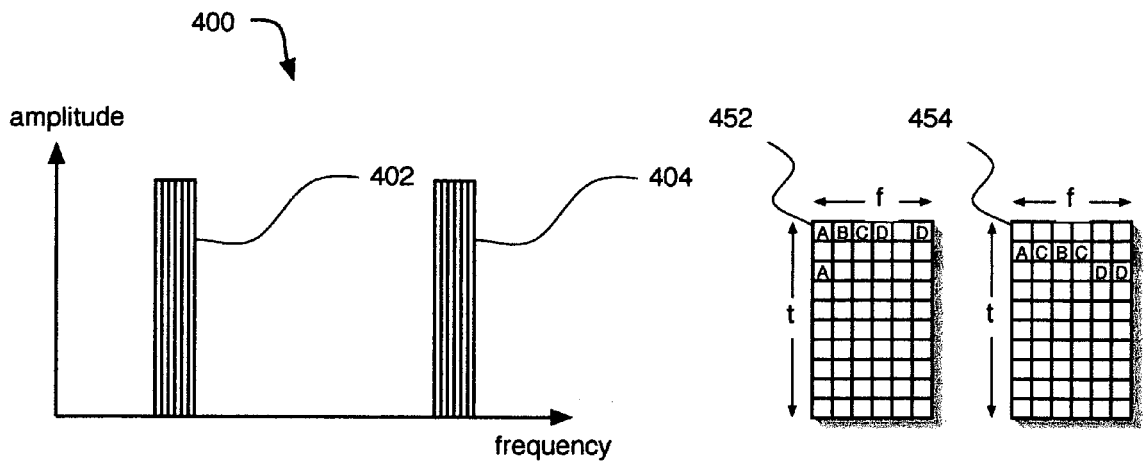
FIG. 4A
FIG. 4B
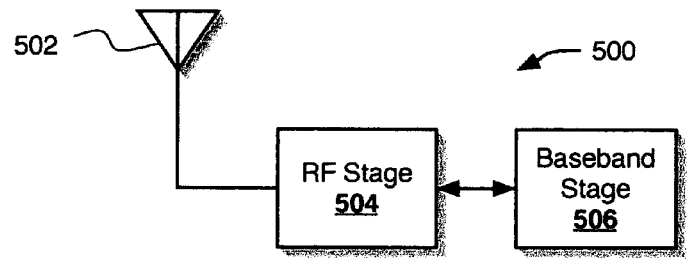
FIG. 5A
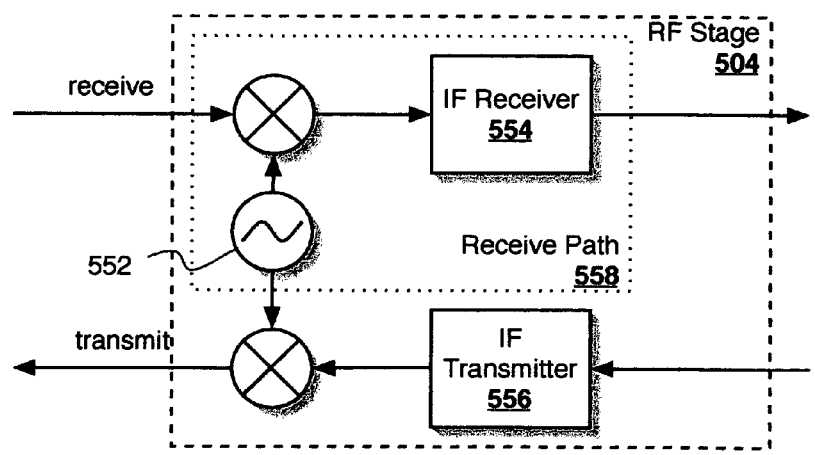
FIG. 5B

NON-SIMULTANEOUS FREQUENCY DIVERSITY IN RADIO COMMUNICATION SYSTEMS

CROSS-REFERENCE TO RELATED APPLICATION

This application is related to U.S. application Ser. No. 10/893,823, now U.S. Pat. No. 7,263,335, titled "MULTI-CONNECTION, NON-SIMULTANEOUS FREQUENCY DIVERSITY IN RADIO COMMUNICATION SYSTEMS" and filed concurrently herewith, which is hereby incorporated by reference in its entirety for all purposes.

TECHNICAL FIELD

This disclosure is directed to a radio communication system and, more particularly, to the use of diversity techniques to improve the performance of radio communications.

BACKGROUND

In radio communication systems, such as, for example, mobile telephone systems and wireless networks, signals propagate through communication channels that are affected by a variety of factors including: atmosphere, man-made structures, terrain, fauna, and radio interference. As signals encounter man-made and natural objects, they may be reflected, refracted, and/or diffracted, resulting in changes in amplitude, phase, and frequency. To confound matters, a signal may reach a receiver through multiple paths, undergoing different distortions along each path. With differing phases and amplitudes, the multipath signals may interfere with one another, further degrading signal quality. Signal attenuation caused by multipath interference or interactions with man-made and natural object is called fading. A deep fade occurs when signal power drops so low as to prevent communications.

Because propagation channels are ever changing, fading is time dependent. Because the effects of reflection, refraction, and diffraction are frequency dependent, fading also is frequency dependent. One solution to the problem of fading is the use of diversity techniques—transmitting duplicate information such that the probability of fading disrupting signal reception is reduced.

Frequency diversity is sometimes used to reduce the likelihood of deep fade. Taking advantage of the frequency-dependent nature of fading, duplicate information is transmitted at different frequencies. As long as both frequency components are not in deep fade, communications can occur.

Time diversity also is used to reduce the likelihood of deep fade. By transmitting duplicate information at a later time, the information is more likely to be received because channel fading likely to differ. To maximize the effectiveness of time diversity, duplicate information should be transmitted after sufficient delay such that the fading characteristics of the communications channel have sufficient time to change.

Additional diversity techniques include path diversity and polarization diversity. By exploiting one or more diversity techniques, modern radio communication systems can significantly mitigate fading.

SUMMARY

In one general aspect, a radio using non-simultaneous frequency diversity includes: an antenna, a radio frequency module coupled to the antenna such that the radio frequency module is operable to transmit or receive radio frequency signals using the antenna, and a baseband module coupled to the radio frequency module. The baseband module is operable to transmit or receive signals through the radio frequency module. Signals transmitted or received by the radio employ non-simultaneous frequency diversity. In some implementations, the radio includes additional antennas.

The radio frequency module may include a local oscillator operable to generate a signal, an intermediate frequency receiver, an intermediate frequency transmitter, a receive mixer coupled to the intermediate frequency receiver and the local oscillator, and a transmit mixer coupled to the intermediate frequency transmitter and the local oscillator. The mixers convert signals between an intermediate frequency and a transmission frequency using the local oscillator signal. The radio is operable to transmit data using non-simultaneous frequency diversity by using the local oscillator to transmit data at a first frequency and by using the local oscillator to transmit data at a second frequency. The radio can implement non-simultaneous frequency diversity using a single receive path. Implementations may use a variety of modulation techniques including orthogonal frequency division multiplexing (OFDM). In addition, a second local oscillator may be used such that the radio is operable to transmit data using non-simultaneous frequency diversity by using the local oscillator to transmit data at a first frequency and by using the second local oscillator to transmit data at a second frequency.

In some implementations, the radio is configured to transmit signals on a first transmission channel and to transmit signals a second transmission channel such that information is transmitted on the first transmission channel and on the second transmission channel to provide non-simultaneous frequency diversity. The frequency separation between the first transmission channel and the second transmission channel is at least 20 MHz. The information transmitted on the first transmission channel and the information transmitted on the second transmission channel may differ by a complex gain and the channels may be single frequencies or may be multiple-frequency wideband channels.

In another general aspect, a method for transmitting information using non-simultaneous frequency diversity includes: identifying information to be transmitted, transmitting the identified information on a first channel, and after a predetermined amount of time, transmitting the identified information on a second channel.

In some implementations, identifying information to be transmitted includes identifying a block to be transmitted from a set of information to be transmitted. The block includes no more than the maximum amount of information that can be transmitted at one time. For example, the size of the block may be based on the size of an orthogonal frequency division multiplexing (OFDM) tone.

The identified information may be transmitted at the first or second frequencies by mixing an intermediate frequency signal with the output from a local oscillator to convert the intermediate frequency signal to the transmission frequency. The same local oscillator may be used for both. In addition, the predetermined amount of time between transmissions may be fixed or dynamic. The radio may be configured to transmit signals on the first transmission channel and to transmit signals on the second transmission channel at consecutive points in time.

In another general aspect, a method for receiving information transmitted using non-simultaneous frequency diversity includes receiving a first signal transmitted on a first channel; after a predetermined amount of time, receiving a second signal transmitted on a second channel; and identifying transmitted information based on the first signal and the second signal.

In some implementations, the method further includes converting the first signal to an intermediate frequency using a signal from a local oscillator, and converting the second signal to an intermediate frequency using a signal from a local oscillator. The same local oscillator may be used to convert both the first signal and the second signal. The amount of time between reception of the first signal and the second signal may be fixed or dynamic.

Implementations may include using a single receive path to receive the first signal transmitted on the first channel and to receive the second signal transmitted on a second channel. The first channel and the second channel may be wideband channel, and the first channel and the second channel differ by at least 20 MHz.

The system may identify the transmitted information by combining the first signal and the second signal using selection diversity, equal gain combining, and/or maximal ratio combining. The details of one or more implementations are set forth in the accompanying drawings and the description below. Other features and advantages will be apparent from the description and drawings, and from the claims.

DESCRIPTION OF DRAWINGS

FIG. 4A is an amplitude-versus-frequency plot of a radio communication system transmission using orthogonal frequency division multiplexing (OFDM).

FIG. 4B is a block diagram of OFDM transmissions at various points in time illustrating non-simultaneous frequency diversity.

FIG. 5A is a block diagram of a radio using non-simultaneous frequency diversity.

FIG. 5B is a block diagram of the radio frequency (RF) stage of a radio using non-simultaneous frequency diversity.

DETAILED DESCRIPTION

Figure 1:
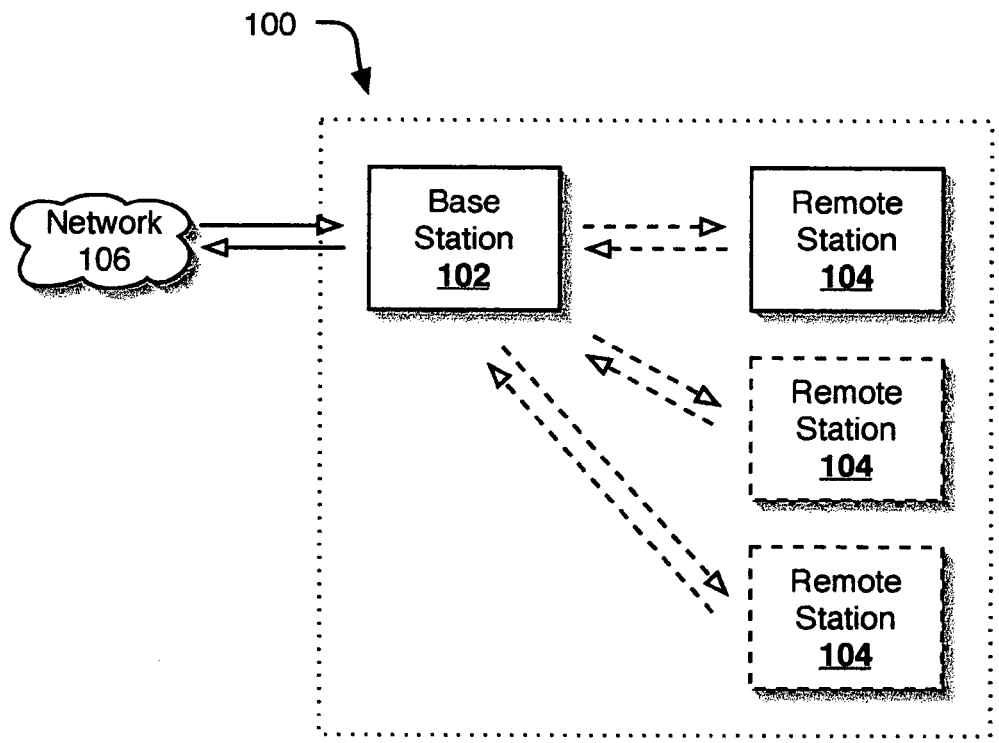
FIG. 1 is a diagram of a radio communication system.

Referring to FIG. 1, a radio communication system 100 comprises a base station 102 operable to communicate with one or more remote stations 104. The base station 102 is coupled to a network 106 such that the base station 102 can transfer information between the network 106 and the remote stations 104. The radio communication system 100 may be used to provide wireless services, such as, for example, wireless metropolitan area networks, wireless local area networks, wireless video-on-demand, and/or wireless voice services.

For example, the radio communication system 100 may be used to implement a wireless local area network (WLAN) based on the IEEE 802.11 standard. In this implementation, the base station 102 serves as an access point or as a router, connecting one or more remote stations 104 to a network 106, which can be a local area network (LAN) or a wide area network (WAN), such as the Internet. The remote stations 104 typically are laptop or desktop computers configured with wireless network interface cards.

The base station 102 is a hardware device that facilitates radio frequency (RF) communications with remote stations 104. The RF communications is typically two-way (with the base station 102 and remote station 104 transmitting and receiving information from one another); however, the non-simultaneous frequency diversity techniques described herein may also be used with one-way RF communications, such as, for example, a video or information broadcast system, or a pager system.

To facilitate two-way RF communications, the base station 102 includes at least one antenna and a signal processing unit. The signal processing unit typically includes components to filter and amplify signals, to convert signals between analog and digital, and to interpret and process received data.

The base station 102 and remote stations 104 may be implemented using conventional electronic design and manufacturing techniques using application-specific integrated circuits and/or commercial off-the-shelf components. Portions of the implementations may be carried out in software-configured digital signal processors (DSPs) or general-purpose microprocessors.

To improve performance, a variety of diversity techniques may be employed including frequency diversity. According to the *Glossary of Telecommunication Terms* (Federal Standard 1037 (2000)), frequency diversity is "transmission and reception in which the same information signal is transmitted simultaneously on two or more independently fading carrier frequencies." Because fading typically is frequency-dependent, frequencies near one another are not likely to fade independently. For this reason, it is useful to choose two or more disparate carrier frequencies. However, using disparate carrier frequencies increases implementation expense and complexity.

Figure 2:
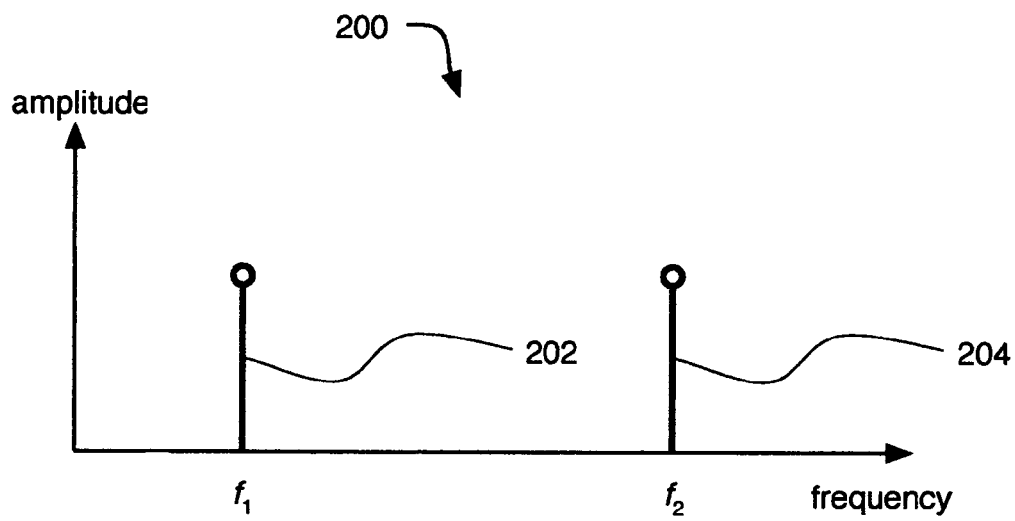
FIG. 2 is an amplitude-versus-frequency plot of a radio communication system transmission using simultaneous frequency diversity.

Referring to FIG. 2, a radio communication system 100 employing simultaneous frequency diversity transmits duplicate information on multiple carriers. For example, data to be sent by a base station 102 to a remote station 104 is transmitted at a first frequency $f_1$ (signal 202) and at a second frequency $f_2$ (signal 204). The two frequencies $f_1$ and $f_2$ should be chosen such that they fade independently. For example, frequencies $f_1$ and $f_2$ can be chosen to be greater than 20 MHz apart so that the likelihood of both channels fading simultaneously is reduced. The frequency separation is implementation-dependent and is affected by a variety of technical and regulatory factors.

In most radio communication systems 100, signals are processed at lower frequencies than their transmission frequencies, decoupling signal processing from transmission. A local oscillator (LO) may be used to generate a signal that is mixed with a data signal to raise its frequency to the transmission frequency. If signals 202 and 204 are too far apart, two LOs may be used with one LO used to generate signal 202 and a second LO to generate signal 204.

So that a remote station 104 does not require simultaneous reception of signals 202 and 204, duplicate information may be transmitted on two or more independently fading carrier frequencies at different points in time. By transmitting signal 202, waiting a period of time, and then transmitting signal 204 at a second frequency, a radio communication system 100 may employ non-simultaneous frequency diversity such that only a single receive path is required, thereby reducing the complexity and expense of both the base station 102 and the remote stations 104.

Figure 3A:
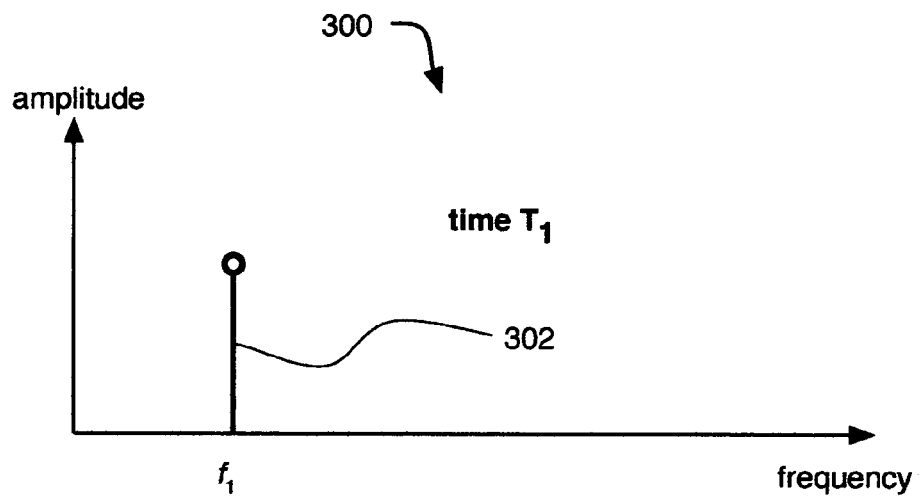
FIGS. 3A and 3B are amplitude-versus-frequency plots of radio communication system transmissions using non-simultaneous frequency diversity.
Figure 3B:
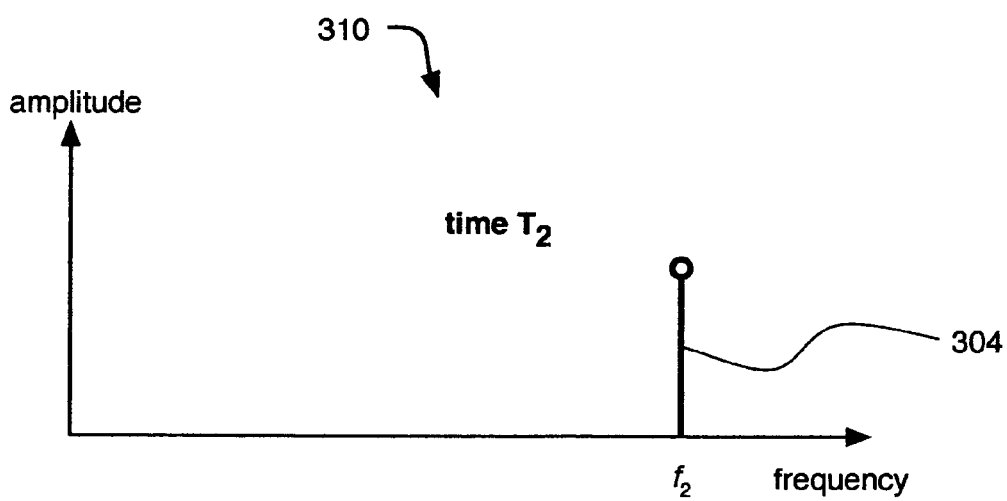

Referring to FIGS. 3A and 3B, a radio communication system 100 using non-simultaneous frequency diversity transmits a signal 302 at a first frequency $f_1$ at time $T_1$ and then transmits a signal 304 containing duplicate information at a second frequency $f_2$ at time $T_2$. These figures only show the amplitude and frequency components of signals 302 and 304; however, they also may include a phase component. The signal 304 duplicates at least some of the information included in signal 302; however, the information may be encoded differently so that the signals 302 and 304 do not have identical amplitudes and phases.

By transmitting duplicate information at different frequencies, non-simultaneous frequency diversity provides many of the benefits of simultaneous frequency diversity without necessitating simultaneous reception. When changing transmission and reception frequencies, some delay is needed to allow the frequency adjustments to settle. The time elapsed between $T_1$ and $T_2$ is predetermined and may be based on the needed delay.

In the examples described above, information is transmitted twice to implement non-simultaneous frequency diversity. However, the information may be transmitted any number of times. Additional redundant transmissions may further improve performance at the expense of bandwidth.

Redundant information may be simply retransmitted, or the radio communication system 100 may apply a complex gain, varying the phase and/or amplitude of the redundant signals. A receiving device may combine the two or more received transmissions, possibly resulting in signal gain.

Figure 3C:
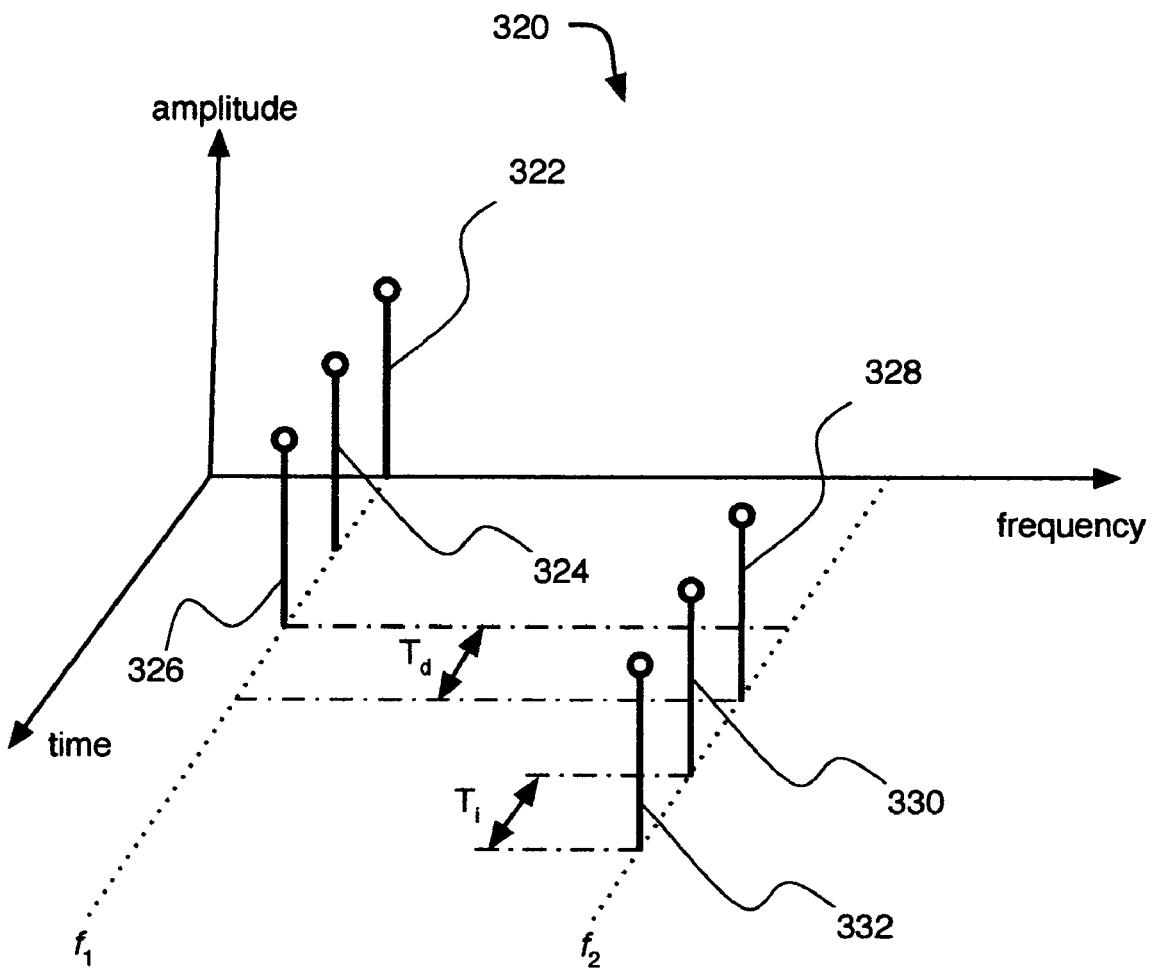
FIG. 3C is an amplitude-frequency-time graph of a series of transmissions using non-simultaneous frequency diversity.

Referring to FIG. 3C, if significant delay is needed between frequency changes, it may be advantageous to transmit multiple signals at the first frequency $f_1$ with a short delay $T_i$ between transmissions and then transmit duplicate information at the second frequency $f_2$, after a delay $T_d$. Any values may be chosen for delays $T_i$ and $T_d$; however, less time is usually needed between transmissions at a single frequency or at nearby frequencies, so $T_i$ is typically smaller than $T_d$. In this example, three signals 322, 324, and 326 are sequentially transmitted at frequency $f_1$. Then, after a delay $T_d$, three signals 328, 330, and 332 are sequentially transmitted at a second frequency $f_2$.

The examples of non-simultaneous frequency diversity described above illustrate the technique in a single-carrier transmission. Some modern communication systems employ multiple-carrier technology, such as, for example, spread spectrum, frequency division multiplexing, and orthogonal frequency division multiplexing (OFDM). Instead of transmitting a signal modulated at a single carrier frequency, a multi-carrier transmission system sends a signal across a wider communication channel, with portions of the signal modulated at various sub-carrier frequencies.

For example, an OFDM communication system transmits an information stream across a wideband channel (e.g., 20 MHz channel) that is divided into many narrow sub-channels. The information stream is broken into blocks such that multiple blocks may be modulated at various sub-carrier frequencies and transmitted across the sub-channels. Each block transmitted at a sub-carrier frequency is called a tone. For example, the IEEE 802.16 standard provides for an OFDM implementation using a wideband channel having many as 2048 tones.

In a multi-carrier system, a transmitted signal spans multiple frequencies. To implement non-simultaneous frequency diversity in a multi-carrier system, information transmitted in a first signal (e.g., one or more tones from an OFDM transmission) is transmitted in a second signal at a later point in time. The information may be encoded differently from the first transmission to the second transmission. For example, the system may apply a complex gain, rearrange portions of the information, or otherwise transform the information such that a receiving system can recover the transmitted information from one or more of the received signals. Because OFDM signals span multiple frequencies, duplicate information may be transmitted on different tones (i.e., modulated at a different sub-carrier frequency) and/or transmitted on different channels (i.e., modulated to a frequency outside the wideband channel of the first transmission).

Referring to FIG. 4A, a transmitted OFDM channel 402 includes multiple blocks of data spread across a range of frequencies (i.e., tones). The OFDM system may be extended to incorporate frequency diversity techniques by transmitting duplicate information in a second OFDM channel 404. If the second OFDM channel 404 is transmitted at a second point in time, then the radio communication system employs non-simultaneous frequency diversity.

Referring to FIG. 4B, an OFDM radio communication system transmits multiple blocks of data simultaneously across multiple frequencies. Diagrams 452 and 454 show tones in an OFDM system transmitted at differing points in time. Diagram 452 shows data transmitted at a first range of frequencies and diagram 454 shows data transmitted at a second range of frequencies. In this example, a first OFDM signal is broadcast including information "A", "B", "C", and "D", with "D" transmitted in duplicate. At a later point in time, a second OFDM signal is broadcast at a second range of frequencies containing the information "A", "B", "C", and "D" with "C" and "D" duplicated. The information "A" is transmitted at corresponding tones within the channel (i.e., at the first data tone of each channel). The information "B" is retransmitted at a different relative location within the channel. The information "C" is transmitted in duplicate (using two separate tones) in the second channel. The information "D" is transmitted in duplicate in both the first and the second channels. Finally, a third OFDM signal is broadcast using the first channel with the information "A". The information may be transmitted any number of times and the system may encode each transmission in a different way (i.e., the system may apply a complex gain or otherwise transform duplicate information).

FIG. 4B shows that non-simultaneous frequency diversity may be implemented in a variety of ways such as, for example, the following: (1) duplicate information transmitted at corresponding frequencies at consecutive points in time (e.g., "A"); (2) multiple copies of duplicate information (e.g., "A", "C", and "D"); (3) duplicate information transmitted at non-consecutive points in time (e.g., "D"); and (4) information duplicated within a single channel (e.g., "D" and the second transmission of "C").

Referring to FIG. 5A, an implementation of a radio communication system 100 using non-simultaneous frequency diversity is built using a radio 500 for the base station 102 and remote stations 104. The radio 500 includes an antenna 502 for receiving and/or transmitting RF signals, a radio frequency (RF) stage 504 for converting signals between transmission frequency and baseband frequency, and a baseband stage 506.

The antenna 502 may be implemented using any conventional technology, such as, for example, a quarter-wave omnidirectional antenna. The radio 500 may use a single antenna for transmission and reception, or it may use multiple antennas to improve performance using beam forming and/or antenna diversity.

In this implementation, signals are processed in software by the baseband stage 506. The baseband stage 506 includes one or more integrated circuits, such as, for example, a digital signal processor (DSP), to implement application logic. In a networking application, the DSP implements the physical layer (PHY), the media access control layer (MAC), and the network layer functions, such as, modulation/demodulation, coding/decoding, and traffic scheduling. The baseband stage 506 also may include components to support wireline (e.g., 10/100 Base T), wireless (e.g., 802.11g), phoneline (e.g., HomePNA), and/or powerline interfaces.

The RF stage 504 includes components to convert signals from transmission frequencies to baseband frequencies and vice versa. The RF stage 506 also provides analog-to-digital converters and digital-to-analog converters so that signals processed by the baseband stage 506 are digital.

Referring to FIG. 5B, the RF stage 504 may be implemented using a local oscillator (LO) 552, an intermediate frequency (IF) receiver 554, and an IF transmitter 556. The LO 552 converts signals between transmission frequency and intermediate frequency which are used by the IF receiver 554 and the IF transmitter 556. The IF receiver 554 takes the received signal after it has been converted to IF and generates signals for processing by the baseband stage 506. The baseband stage 506 sends signals for transmission to the IF transmitter 556 in the RF stage. The IF transmitter 556 generates a transmission signal at the intermediate frequency, which is mixed with a signal from the LO 552 to convert the signal to transmission frequency.

The local oscillator 552 and IF receiver 554 make up a receive path 558. Because the radio 500 uses non-simultaneous frequency diversity, only a single receive path is needed. To transmit information at two frequencies, the IF transmitter 556 provides an RF signal that is mixed with a signal from the LO 552 to convert the signal to a first transmission frequency. Then, the LO 552 may be used to produce a second signal to convert the same IF transmitter 556 signal to a second transmission frequency. Because the transmissions do not occur simultaneously, multiple IF transmitters 556 are not needed and the signal may be received using a single IF receiver 554 in a single receive path 558. The implementation shown in FIG. 5B is included to illustrate the receive path 558 benefits of non-simultaneous frequency diversity. In practice, additional components would be included, such as, for example, various filters, amplifiers, and logic.

If the first and second transmission frequencies vary greatly, the local oscillator 552 may take too much time to settle. One solution is to use multiple local oscillators 552 with logic provided to select the appropriate LO 552 signal for a particular transmission or reception. Using two LOs 552, a radio 500 may down-convert a first transmission using the signal from one LO 552 and down-convert a second transmission using the signal from another LO 552. In this manner, the IF receiver 554 and the same receive path 558 may be used to provide frequency diversity.

Figure 6A:
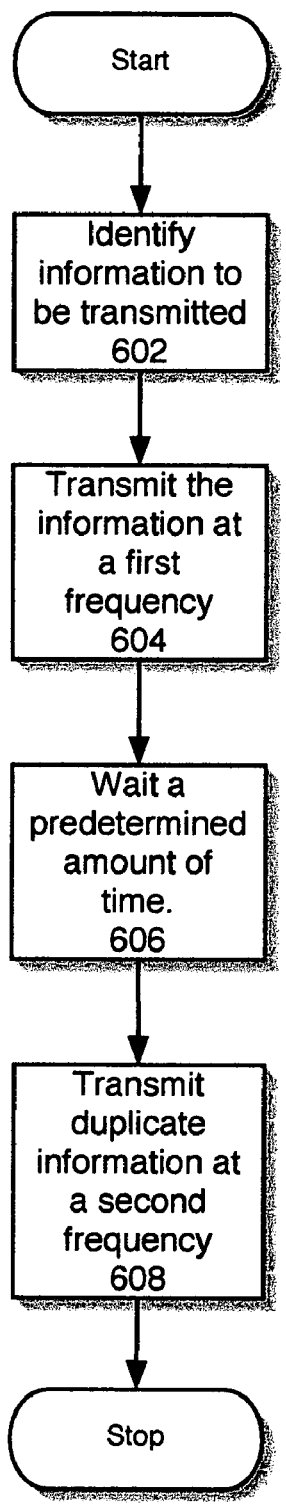
FIG. 6A is a flow chart of a method of transmitting information using non-simultaneous frequency diversity.

Referring to FIG. 6A, a base station 102 or a remote station 104 may transmit a signal using non-simultaneous frequency diversity by first identifying the information to be transmitted (602). In a network implementation, the data link layer breaks information into frames for transmission across the physical layer. In this implementation, the information to be transmitted includes a single frame. The size of a frame may be dependent on link quality—if link quality is high, more information may be transmitted at each frequency; however, as link quality degrades, less and less information may be differentiated in a received signal. The information is then transmitted at a first frequency (604).

The system then waits a predetermined amount of time before transmitting duplicate information (606). The amount of time to wait may be fixed or dynamic. If the wait time is fixed, it is best to choose the least amount of time such that the system can transmit at a different frequency. After a predetermined amount of time (606), the system transmits duplicate information at a second frequency (608). The duplicate information may be identical to the information initially transmitted, or it may be encoded differently. Any coding techniques may be used so long as the receiving device is able to obtain the transmitted information from both the first and the second transmissions (if both are received correctly).

In a broadband wireless implementation, multiple base stations 102 are distributed through a service area. These base stations and their antennas may be placed, for example, on towers, utility poles, or buildings. Throughout the service area, customers may install subscriber stations (remote stations 104) that may be used to communicate with a base station 102 to enable Internet access. In this implementation, RF signals are affected by a variety of man-made and natural objects, causing multipath interference and fading. To improve performance, this system uses OFDM and non-simultaneous frequency diversity.

Figure 6B:
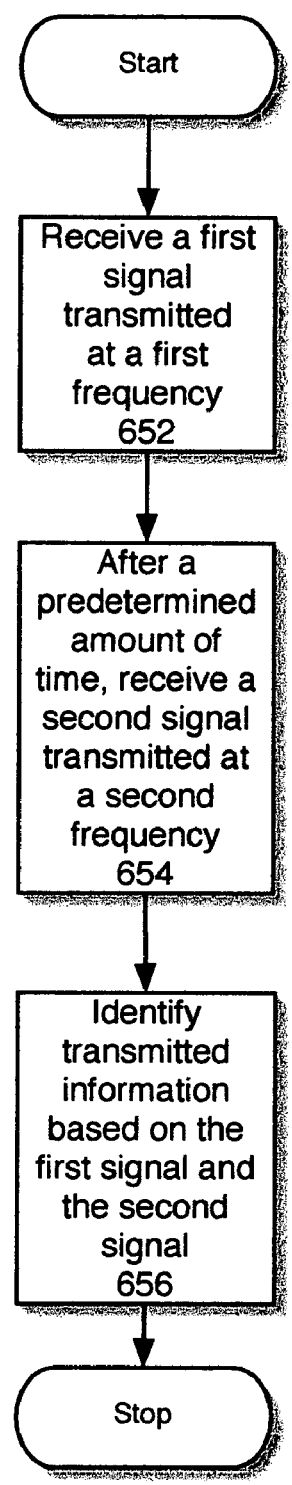
FIG. 6B is a flow chart of a method of receiving information transmitted using non-simultaneous frequency diversity.

Referring to FIG. 6B, a base station 102 or remote station 104 receives a signal transmitted using non-simultaneous frequency diversity by first receiving a first signal transmitted at a first frequency (652). After a predetermined amount of time, the system receives a second signal transmitted at a second frequency (654). The waiting period may be fixed or may be dynamically adjusted based on system performance.

Once the first signal and second signals have been received, the system identifies the transmitted information based on the two signals (656). Any diversity combining technique may be used to identify the transmitted signal including: selection diversity, equal gain combining, and maximal ratio combining. Using selection diversity, the system simply uses the strongest signal (i.e., the one with the highest signal-to-noise ratio). Using equal gain combining, signals are linearly added. Using maximal ratio combining, weights are calculated to combine the received signals to maximize the signal-to-noise ratio.

In one implementation, the radio communication system 100 provides broadband wireless Internet services (based on the IEEE 802.16 standard), enabling remote devices 104 to access the Internet (network 106) through the base station 102. The remote devices 104 (also called subscriber units) may be deployed to customer's homes to enable high-speed Internet access similar to that provided by DSL or cable. Many wireless network systems employ orthogonal division multiplexing (OFDM) because it provides high spectral efficiency by spreading signals across a block of frequencies. In this implementation, OFDM is used along with non-simultaneous frequency diversity to improve performance.

Non-simultaneous frequency diversity may be used in any wireless technology to improve system performance without requiring that two disparate RF signals be received at the same time. A number of implementations have been described. Nevertheless, it will be understood that various modifications may be made without departing from the spirit and scope of the invention. Accordingly, other implementations are within the scope of the following claims.

What is claimed is:

1. A radio using non-simultaneous frequency diversity, the radio comprising:
   an antenna;
   a radio frequency module coupled to the antenna such that the radio frequency module is operable to transmit or receive radio frequency signals using the antenna and non-overlapping communication channels; and
   a baseband module coupled to the radio frequency module, the baseband module operable to transmit or receive signals through the radio frequency module, such that signals transmitted or received by the radio employ non-simultaneous frequency diversity using the non-overlapping communication channels,
   wherein the baseband module uses orthogonal frequency division multiplexing (OFDM).

2. The radio of claim 1 further comprising a second antenna coupled to the radio frequency module.

3. The radio of claim 1 wherein the radio frequency module comprises:
   a local oscillator operable to generate a signal;
   an intermediate frequency receiver
   an intermediate frequency transmitter;
   a receive mixer coupled to the intermediate frequency receiver and the local oscillator; and
   a transmit mixer coupled to the intermediate frequency transmitter and the local oscillator,
   wherein the receive mixer and the transmit mixer convert signals between an intermediate frequency and a transmission frequency using the local oscillator.

4. The radio of claim 3 wherein the radio is operable to transmit data using non-simultaneous frequency diversity by using the local oscillator to transmit data at a first frequency and by using the local oscillator to transmit data at a second frequency.

5. The radio of claim 3 wherein the receive mixer, the local oscillator, and the intermediate frequency receiver form a receive path such that the radio employs non-simultaneous frequency diversity using a single receive path.

6. The radio of claim 3 further comprising a second local oscillator such that the radio is operable to transmit data using non-simultaneous frequency diversity by using the local oscillator to transmit data at a first frequency and by using the second local oscillator to transmit data at a second frequency.

7. The radio of claim 1 wherein the radio is configured to transmit signals on a first transmission channel and to transmit signals on a second transmission channel such that information is transmitted on the first transmission channel and on the second transmission channel to provide non-simultaneous frequency diversity.

8. The radio of claim 7 wherein the frequency separation between the first transmission channel and the second transmission channel is at least 20 MHz.

9. The radio of claim 7 wherein the information transmitted on the first transmission channel and the information transmitted on the second transmission channel differ by a complex gain.

10. The radio of claim 7 wherein the first transmission channel and the second transmission channel are wideband channels.

11. The radio of claim 7 wherein the radio is configured to transmit signals on the first transmission channel and to transmit signals on the second transmission channel at consecutive points in time.

12. A method for transmitting information using non-simultaneous frequency diversity comprising:
    identifying information to be transmitted;
    transmitting the identified information on a first channel; and
    after a predetermined amount of time, transmitting the identified information on a second channel, such that the first channel and the second channel are non-overlapping orthogonal frequency division multiplexing (OFDM) channels.

13. The method of claim 12 wherein identifying information to be transmitted includes identifying a block to be transmitted from a set of information to be transmitted.

14. The method of claim 13 wherein the block includes no more than the maximum amount of information that can be transmitted at one time.

15. The method of claim 14 where the size of the block is based on the size of an orthogonal frequency division multiplexing (OFDM) tone.

16. The method of claim 12 wherein transmitting the identified information at a first frequency includes mixing an intermediate frequency signal with the output from a local oscillator to convert the intermediate frequency signal to the first frequency.

17. The method of claim 16 wherein transmitting the identified information at a second frequency includes mixing an intermediate frequency signal with the output from a local oscillator to convert the intermediate frequency signal to the second frequency.

18. The method of claim 17 wherein the same local oscillator is used to convert the intermediate frequency signals to the first frequency and to the second frequency.

19. The method of claim 12 wherein the predetermined amount of time is fixed.

20. The method of claim 12 wherein the predetermined amount of time is dynamic.

21. A method for receiving information transmitted using non-simultaneous frequency diversity comprising:
    receiving a first signal transmitted on a first channel;
    after a predetermined amount of time, receiving a second signal transmitted on a second channel, such that the first channel and the second channel are non-overlapping orthogonal frequency division multiplexing (OFDM) channels; and
    identifying transmitted information based on the first signal and the second signal.

22. The method of claim 21 further comprising converting the first signal to an intermediate frequency using a signal from a local oscillator.

23. The method of claim 22 further comprising converting the second signal to an intermediate frequency using a signal from a local oscillator.

24. The method of claim 23 wherein the same local oscillator is used to convert the first signal to an intermediate frequency and to convert the second signal to an intermediate frequency.

25. The method of claim 21 wherein the predetermined amount of time is fixed.

26. The method of claim 21 wherein a single receive path is used to receive the first signal transmitted on the first channel and to receive the second signal transmitted on a second channel.

27. The method of claim 21 wherein the first channel and the second channel are wideband channels.

28. The method of claim 21 wherein the first channel and the second channel differ by at least 20 MHz.

29. The method of claim 21 wherein identifying transmitted information based on the first signal and the second signal includes combining the first signal and the second signal using selection diversity.

30. The method of claim 21 wherein identifying transmitted information based on the first signal and the second signal includes combining the first signal and the second signal using equal gain combining.

31. The method of claim 21 wherein identifying transmitted information based on the first signal and the second signal includes combining the first signal and the second signal using maximal ratio combining.

* * * * *